US006919997B2

(12) United States Patent
Forrer et al.

(10) Patent No.: US 6,919,997 B2
(45) Date of Patent: Jul. 19, 2005

(54) COMPACT DEVICE FOR IMAGING A PRINTING FORM

(75) Inventors: Martin Forrer, St. Gallen (CH); Axel Gebhardt, Moenkeberg (DE); Eckhard Langenbach, Speicherschwendi (CH); Lars Paulsen, Hollingstedt (DE); Thomas Rupp, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/625,225

(22) Filed: Jul. 23, 2003

(65) Prior Publication Data

US 2004/0136094 A1 Jul. 15, 2004

Related U.S. Application Data

(60) Provisional application No. 60/399,581, filed on Jul. 30, 2002.

(30) Foreign Application Priority Data

Jul. 24, 2002 (DE) ........................................ 102 33 491

(51) Int. Cl.[7] ................................................ G02B 17/00

(52) U.S. Cl. ....................................... 359/732; 359/726

(58) Field of Search ......................... 359/726, 727–731, 359/732, 708, 663, 196–197, 202, 204–205, 208–210

(56) References Cited

U.S. PATENT DOCUMENTS

| | | | | |
|---|---|---|---|---|
| 4,279,472 A | | 7/1981 | Street | 250/201 |
| 4,428,647 A | | 1/1984 | Sprague et al. | 359/20 |
| 4,651,170 A | * | 3/1987 | Chandler et al. | 347/259 |
| 5,064,260 A | | 11/1991 | Shiraishi | 359/205 |
| 5,986,819 A | | 11/1999 | Steinblatt | 359/663 |
| 6,172,788 B1 | * | 1/2001 | Suzuki et al. | 359/204 |
| 6,198,563 B1 | | 3/2001 | Atsuumi | 359/208 |
| 6,366,383 B1 | | 4/2002 | Roeder | 359/202 |
| 6,512,780 B1 | | 1/2003 | Dieckmann | 372/9 |
| 6,603,498 B1 | * | 8/2003 | Konnunaho et al. | 347/236 |
| 6,768,505 B2 | * | 7/2004 | Zelenka | 347/233 |
| 2001/0026391 A1 | * | 10/2001 | Ishibe | 359/196 |
| 2003/0007066 A1 | | 1/2003 | Forrer et al. | 347/241 |

FOREIGN PATENT DOCUMENTS

| | | |
|---|---|---|
| DE | 19906874 | 1/2001 |
| DE | 10115875 | 10/2002 |
| EP | 0415236 | 1/1995 |
| EP | 0878773 | 11/1998 |

* cited by examiner

*Primary Examiner*—Jordan M. Schwartz
(74) *Attorney, Agent, or Firm*—Davidson, Davidson & Kappel, LLC

(57) ABSTRACT

A compact device for imaging (10) a printing form (12), including a number of light sources (14) as well as imaging optics (18) for producing a number of image spots (16) of the light sources (14) on the printing form (12), the imaging optics (18) including at least one macro-optical system (20) of refractive optical components (32, 56, 58; 60, 62, 64), the imaging device having the feature that the optical path (22) from the light sources (14) to the image spots (16) passes through the macro-optics (20) twice. The installation-space saving imaging device (10) can be used in a printing unit (88) of a printing press (90).

38 Claims, 5 Drawing Sheets

COMPACT DEVICE FOR IMAGING A PRINTING FORM

Priority to German Patent Application No. 102 33 491, filed Jul. 24, 2002, and to U.S. Provisional Patent Application No. 60/399,581, filed Jul. 30, 2002, is hereby claimed. Both of these applications are hereby incorporated by reference herein.

BACKROUND INFORMATION

The present invention relates to a device for imaging a printing form, including a number of light sources as well as imaging optics for producing a number of image spots of the light sources on the printing form, the imaging optics including at least one macro-optical system of refractive optical components.

In order to pattern printing forms, in particular printing plates, into ink-accepting and ink-repelling regions, the printing form surface, which is initially in an unpatterned, for example, ink-accepting state, is often partially exposed to the influence of electromagnetic radiation, in particular heat or light of different wavelengths, so as to produce the other, for example, ink-repelling state at the affected positions. To image a printing form selectively, accurately and rapidly, a number of individually addressable light sources, in particular laser light sources, that are arranged in an array in rows or in the form of a matrix are often used in parallel operation, the light sources being projected through imaging optics onto the surface of the printing form, which is located in the image field of the imaging optics.

In this context, a number of requirements for the fulfillment of various functionalities are placed on an imaging optical system in such a device for imaging a printing form, whether in a printing form imaging unit or in a printing unit. First of all, a part of the imaging optics is intended for globally projecting the number of light sources to image spots with as few imaging defects as possible. This part for projecting a plurality of light sources together to image spots is herein defined as "macro-optics" or "macro-optical system". Secondly, further parts of the imaging optics or parts of the macro-optics itself can fulfill additional functionalities, such as a possibility of adjusting the focus position.

Frequently, the light source arrays are composed of a certain number of individually addressable diode lasers, preferably single-mode diode lasers, which are arranged on a semiconductor substrate at certain intervals, typically at equal, i.e. substantially equal, intervals, and which have a common output plane that is precisely defined by the crystal fracture plane (IAB, individually addressable bar). Since the light-emission cones of these diode lasers have different opening widths in the two essentially orthogonal planes of symmetry, there is a need for optical correction to reduce the asymmetric divergence of the emerging light. The ratio of opening angles can be adjusted individually. This correction is carried out with respect to the individual light sources using a part of the imaging optics that is also referred to as "micro-optics".

A number of imaging optics which were designed especially for projecting diode laser rows in order to image an image carrier are known from the prior art. For example, U.S. Pat. No. 4,428,647 describes an imaging device including a semiconductor laser array whose individual lasers each have associated therewith a nearby lens for correcting divergence. The light of the semiconductor lasers is then collected by an objective lens and focused onto an image carrier. An imaging device having an individually addressable diode laser array is known from European Patent Application No. EP 0 878 773 A2. The imaging optics has a micro-optical part and a macro-optical parts. The macro-optical part is a confocal lens arrangement that is telecentric on both sides. Prior German Patent Application No. DE 101 15 875.0 describes an imaging device having an array of light sources. The imaging optics includes micro-optics which produces virtual intermediate images of the light sources as well as macro-optics which contains a convex mirror and a concave mirror having a common center of curvature, a combination of the so-called "open type" and which produces a real image of the virtual intermediate images.

The approaches known from the prior art have in common that they require a large installation space compared to their functionalities. Modification or complementation with further functionalities can only be achieved with difficulty. Since, first of all, the installation space in such machines is very limited and, secondly, the design or configuration of the printing form imaging unit or of the printing unit can be modified only slightly for implementing an imaging device, it is necessary to reduce the installation space requirement without limiting the necessary functionalities. Moreover, an imaging optical system on a printing press or on a printing form imaging unit is subject to shocks or vibrations, which is why optical systems known from the prior art can generally not easily be transferred for use on a printing form imaging unit or inside a printing unit of a printing press.

SUMMARY OF THE INVENTION

An object of the present invention is to provide a compact device for imaging a printing form which allows easy integration into the available installation space in a printing unit of a printing press.

According to the present invention, a device for imaging a printing form has a number of light sources as well as imaging optics for producing a number of image spots of the light sources on the printing form. The imaging optics includes at least one macro-optical system of refractive optical components or optical elements, in particular, a number of lenses, which is traversed twice by the optical path from the light sources to the image spots. In the context of this description, the word "optical path" is understood to mean all the optical paths of the number of light sources. In particular, the refractive optical components are passed through twice. It is the refractive optical components that substantially contribute to the generation of the number of image spots. Since the optical path passes through the macro-optics multiple times or repeatedly, the macro-optics can have a more compact and installation-space saving design compared to macro-optics having a simple optical path, while maintaining the same functionality. The number of light sources can also be 1; preferably, however, provision is made for a plurality of light sources. The light sources can be arranged in a one-dimensional array (line, preferred) or in a two-dimensional array, in particular in a regular array, preferably in a Cartesian arrangement. The light sources and the image spots are in a one-to-one functional relationship with each other. The image spots are disjunct from each other. It is possible for the image spots to be dense or, preferably, not to be dense with respect to each other; that is, their spacing can be greater than the minimum spacing of the printing dots to be placed. The spacing of neighboring image spots on the printing form in units of the minimum printing dot spacing is preferably a natural number that is relatively prime to the number of image spots (light sources). The printing form is preferably an offset printing form.

In this context, the optical path can run non-centrally through the macro-optics. In particular, the optical path can be different on the first path through the macro-optics than on the second path through the macro-optics. Moreover, the optical path can run symmetrically to the optical axis of the macro-optics. In particular, the first path can run symmetrically to the second path.

The double passage of the optical path through the macro-optics can be such that the first principal plane and the second principal plane of the macro-optics are located on one side of the macro-optics. The macro-optics can be designed in such a manner that objects (a number of light sources) and images are located on one side of the macro-optics. In other words, the optical path passes through the macro-optics on a first path in a first direction and on the second path in a direction opposite to the first direction.

In an advantageous embodiment of the device for imaging a printing form, at least one mirror, in particular a plane mirror, is associated with the macro-optics. The macro-optics can be designed in such a manner that the optical path passes through the macro-optics in a first direction on its first path until the light hits the at least one mirror, whereupon it passes through the macro-optics in a direction opposite to the first direction on its second path. The macro-optics is virtually equal to an optical system of double the size. In other words, a macro-optical system composed of a number of optical elements is optically doubled in size or doubled by the mirror or mirrors; the mirror or mirrors reflecting the light into a symmetrical second passage through the macro-optics.

In a device according to the present invention for imaging a printing form, the macro-optics can include at least one part that is designed as an adaptive optic, or at least one of the associated mirrors can be designed to be adaptive. In particular, at least one of the associated mirrors can be designed as an adaptive mirror, i.e., with a variable radius of curvature or with a variable surface structure. By varying the radius of curvature, it is possible to change the image width. A variation of the radius of curvature is small compared to the dimensions of the adaptive mirror. The adaptive mirror can also enable the wavefront of the light to be manipulated on the optical path through the macro-optics, for example, to achieve an axial change in focusing/defocusing. The adaptive mirror can be an adjustable element for compensating imaging defects. An adaptive mirror can be a membrane mirror, an electrostatic mirror, a bimorph mirror, a piezo-electrically driven (for example, polish-milled) metal mirror, or the like.

In an advantageous embodiment of the device according to the present invention for imaging a printing form, the macro-optics can include at least one movable lens, or, alternatively, a movable mirror. The movable lens is preferred, in particular because the telecentricity of macro-optics is maintained although the lens is moved. When the printing form or printing plate is clamped to a cylinder, the attachment often causes a disturbing curvature ("plate bubble"), which can be on the order of several 100 micrometers. Due to the curvature, it is possible for the printing form surface to come to rest outside the usable focal range of the laser radiation so that the power density of the laser radiation at such a distance from the focus position is not sufficient to achieve an acceptable imaging result. A movable lens in the macro-optic makes it possible for the focus position of the laser radiation to be moved (refocused) in the direction of the optical axis in a simple manner. The accuracy requirements for this refocusing result from the depth of focus of the laser beams. The device according to the present invention allows easy integration of the functionality of focus displacement. The device has a defined distance between the last optical component and the printing form, the distance remaining unchanged by the focus displacement. At the same time, it is possible to obtain a good ratio between the displacement of the movable lens and the focus position variation.

In an advantageous embodiment of the device for imaging a printing form, the light sources are individually addressable lasers. Each light source corresponds to an individually addressable imaging channel having one imaging beam. In particular, the light sources can emit in the infrared (preferred), visible, or ultraviolet spectral ranges. In an advantageous refinement, the lasers can be tunable and/or operated in pulsed mode in the nanosecond, picosecond, or femtosecond regime. The individually addressable lasers can be, in particular, diode lasers or solid lasers. The individually addressable lasers can be integrated on one or more bars, which, in particular, can be one or more individually addressable bars (IAB), preferably single-mode. A typical IAB includes 4 to 1,000 lasers, in particular, 30 to 260 lasers. The lasers are located on the IAB preferably at substantially equal intervals, in particular in a line (one-dimensional array) or on a grid (two-dimensional array).

In the device according to the present invention for imaging a printing form, a micro-optical system can be arranged downstream of the number of light sources along the optical path, the micro-optics being arranged upstream of the macro-optics along the optical path. For diode lasers, in particular on a bar, the micro-optics can be used, inter alia, for adjusting the beam diameters. Due to the very small diameters of the individual laser beams at the front of the IAB, typically a few micrometers in the horizontal direction (slow axis) and a few micrometers in the vertical direction (fast axis), the beam diameters need to be adjusted in both axes independently of each other in order to achieve the diameters needed on the printing form, typically a few micrometers in the horizontal or vertical directions. The aim is to obtain fundamental mode Gaussian laser beams that are as ideal as possible, because these have the greatest natural depth of focus and, thus, are maximally insensitive to shifts in focus or "plate bubbles". The lasers are preferably operated in single mode. A micro-optics can be arranged downstream of the individually addressable lasers, allowing the beam diameters of the light beams emerging from the lasers to be influenced in two orthogonal axes independently of each other, i.e. to be adjusted independently of each other. The image spots of the micro-optics (intermediate image) can be real or virtual. In particular, the micro-optics can be produce a virtual, enlarged intermediate image of the number of light sources that is projected by the macro-optics.

In the device according to the present invention for imaging a printing form, it is particularly advantageous if the light of the number of light sources is coupled into the macro-optics via at least one light-deflecting element. This measure makes it possible to make the design even more compact. As an alternative to a mirror pair, it is possible and preferred to use a Porro prism as the light-deflecting element to couple the light of the number of light sources into the macro-optics. Using a Porro prism, it is also possible to adjust the optical path through the macro-optics.

In an advantageous embodiment, the macro-optics of the device according to the present invention is telecentric on both sides. In this connection, it should be pointed out that during focusing, for example, using an adaptive mirror or a movable lens in the macro-optics of the device according to the present invention, the telecentricity is maintained. In other words, the object-to-image distance is changed by the focus displacement described in detail above, while the object distance is fixed. Using an optical path that is telecentric over the whole extent, it is achieved that the size of the image is not changed or changed only within very small tolerances of typically ±1 micrometers in the directions orthogonal to the beam propagation (optical axis). Moreover, the macro-optics can advantageously be designed to allow imaging essentially without changing the size, i.e. 1:1 imaging. The focal length of the macro-optics is preferably infinite.

In an advantageous embodiment of the device according to the present invention, correction optics for adjusting the image size can be arranged downstream of the macro-optics along the optical path. The correction optics permits very high positional accuracy of the image spots and preferably also a very accurate adjustment of the image size. Preferably, the correction optics is a zoom lens system of two lenses. The zoom lens system itself is telecentric on both sides, just as the macro-optics. The telecentricity is maintained during adjustment of the image size.

In an advantageous embodiment of the device according to the present invention, neighboring image spots of the number of image spots of the light sources on the printing form can have a substantially equal distance a, i.e. equal distance a, which is a whole-number multiple of minimum printing dot spacing p. In particular, the number of light sources can advantageously be n, with n being relatively prime to the number (a/p), so that a non-redundant interleaving method can be carried out for imaging the printing form. Obviously, n and (a/p) are not both 1 simultaneously.

In a preferred embodiment of the device according to the present invention for imaging a printing form, the printing form to be imaged can be mounted on a rotatable cylinder. Alternatively, the surface of a rotatable cylinder can constitute a printing form. In other words, the printing form can be a plate-shaped printing form (having one edge) or a sleeve-shaped printing form (having two edges). It can be a (conventional) printing form that can be written once, a recoatable or a rewritable printing form. In the context of this description of the device according to the present invention, "printing form" is understood to include also a so-called "digital printing form". A digital printing form is a surface that is used as an intermediate carrier for printing ink before this printing ink is transferred to a printing substrate. In this context, the surface itself can be patterned into ink-accepting and ink-repelling regions, or only be provided with printing ink in a patterned manner through imaging. Interaction with laser radiation allows the digital printing form to be patterned into regions which do or do not deliver the printing ink to a printing substrate or to an intermediate carrier. The patterning of the digital printing form can be carried out prior or subsequent to applying ink to the printing form. The printing form can also be essentially composed of the printing ink itself, for example, for use in a thermal transfer method.

The imaging device according to the present invention can be used especially advantageously in a printing form imaging unit or in a printing unit of a printing press. A printing unit can contain one or more imaging devices. A plurality of devices can be arranged in such a manner that they can concurrently image partial areas of a printing form. A printing press according to the present invention, which features one or more inventive printing units can be a web-fed or sheet-fed press. A sheet-fed press can typically include a feeder, a delivery, and one or more finishing stations, such as a varnishing unit or a dryer. A web-fed printing press can have a folding apparatus arranged downstream. The underlying printing method of the inventive printing unit or of the inventive printing press can be a direct or indirect planographic printing method, a flexographic printing method, an offset printing method, a digital printing method, or the like.

Also related to the inventive idea is a method for changing the relative position of an image spot with respect to the position of a printing form in a device for imaging a printing form, including a number of light sources as well as imaging optics for producing a number of image spots of the light sources on the printing form, the imaging optics including at least one macro-optical system. The method according to the present invention has the feature that a lens of the macro-optics that is traversed twice by the optical path is moved. When using macro-optics which is traversed twice by the optical path, the object-to-image distance can be changed by moving a lens in the macro-optics, while the object distance is fixed. Advantageously, the telecentricity is maintained. The method according to the present invention can preferably be carried out using a device for imaging a printing form, such as is described in this specification.

BRIEF DESCRIPTION OF THE DRAWINGS

Further advantages as well as expedient embodiments and refinements of the present invention will be depicted by way of the following Figures and the descriptions thereof. Specifically.

DETAILED DESCRIPTION

Figure 1:
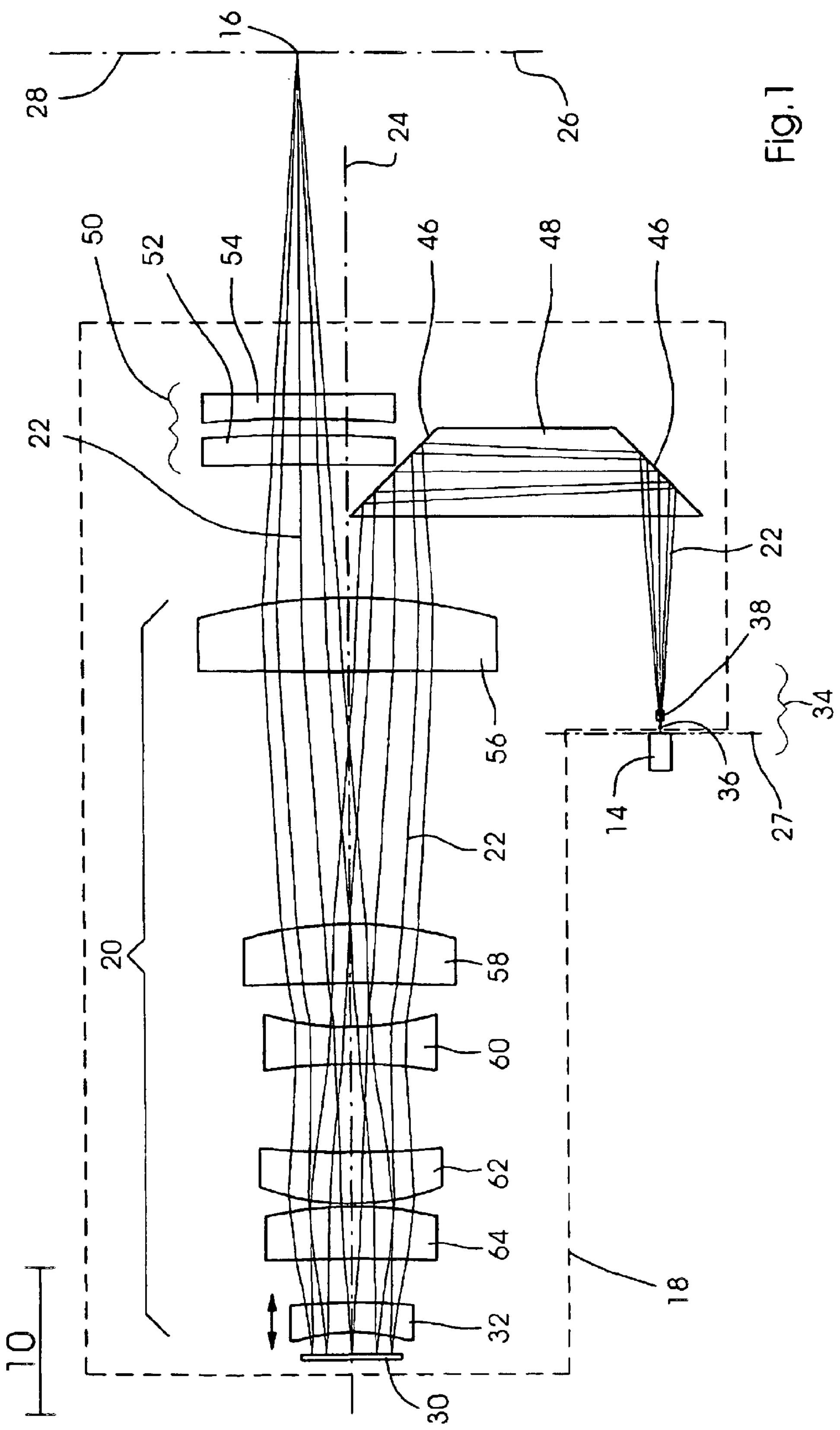
FIG. 1 shows a preferred embodiment of the imaging optics of the device according to the present invention for imaging a printing form.

FIG. 1 shows a preferred embodiment of the imaging optics of the device according to the present invention for imaging a printing form. Along optical path 22, starting at the number of light sources 14, in a preferred embodiment an individually addressable diode laser bar (IAB), imaging optics 18 includes micro-optics 34, a Porro prism 48, macro-optics 20, i.e. a lens system producing a 1:1 image, and correction optics 50. Imaging optics 18 produces a number of image spots 16 of the number of light sources 14. At the top left of FIG. 1, a scale in millimeters is added for quantitative purposes.

Using micro-optics 34, the beam diameters can be influenced independently of each other in the two orthogonal directions perpendicular to the propagation direction (optical axis). The micro-optics makes it possible to adjust the size of the spots to be imaged. FIG. 2 serves to illustrate in more detail micro-optics 34, which includes a fast-axis lens 36 and a slow-axis lens 38. The number of light sources 14 and micro-optics 34 can also be enclosed in a common housing. Porro prism 48, or alternatively two mirrors, is used to couple the light into the multiple-lens 1:1 lens system of macro-optics 20 and to align the beams in the image plane. Inner surfaces of Porro prism 48 serve as light-deflecting elements 46 through total reflection. Macro-optics 20 includes a first lens 56, a second lens 58, a third lens 60, a fourth lens 62, a fifth lens 64, a movable lens 32 (the moving direction is indicated by the double arrow), and a mirror 30. The lenses of the macro-optics and mirror 30 are arranged axisymmetrically around the optical axis 24. Optical axis 22 does not run along optical axis 24, but non-centrally or off-axis. Using mirror 30, which is preferably provided with a highly reflective coating, the light is reflected and passes through micro-optics 20 again; however, in such a manner that it is symmetrically mirrored on optical axis 24 with respect to the first path. In other words, optical path 22 runs through macro-optics 20 such that it is folded. First principal plane 26 and second principal plane 28 of the macro-optics are located on one side of macro-optics 20, in particular, symmetrically. In the preferred embodiment shown in FIG. 1, a Porro prism 48 is arranged upstream of macro-optics 20. In consequence, spots of mirrored principal plane 27, in which are located light sources 14, are imaged onto second principal plane 28 of macro-optics 20. To adjust the focus position of image spots 16, the object-to-image distance of macro-optics 20, which is traversed twice by the optical path, is changed in a controlled manner. In this embodiment, this is done by moving movable lens 32. Due to the double passage and the suitable design of macro-optics 20, a good ratio between the displacement of movable lens 32 and the change in the focus position of image spots 16 is achieved; a displacement by s results in a change by m*s, with m>>1. The optical path through macro-optics 20 is telecentric. In the embodiment shown in FIG. 1, telecentric correction optics 50 including a first lens 52 and a second lens 54 is arranged downstream of macro-optics 20 for fine correction. Correction optics 50 is a two-lens zoom lens system which allows stepless adjustment of the image size in a range of plus or minus a few percent, approximately from 0.9 to 1.1.

Figure 2A:
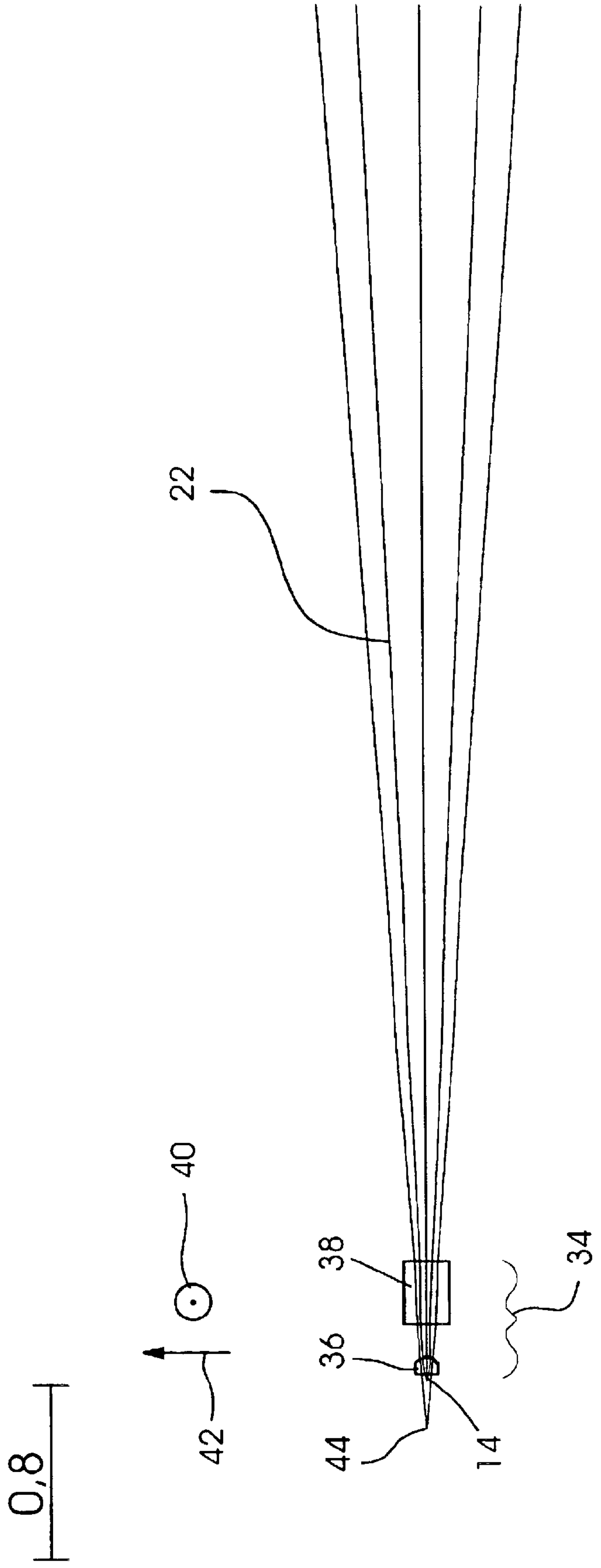
FIG. 2 shows a preferred embodiment of the micro-optics of the device according to the present invention for imaging a printing form, with Subfigure A in the vertical plane and Subfigure B in the horizontal plane.
Figure 2B:
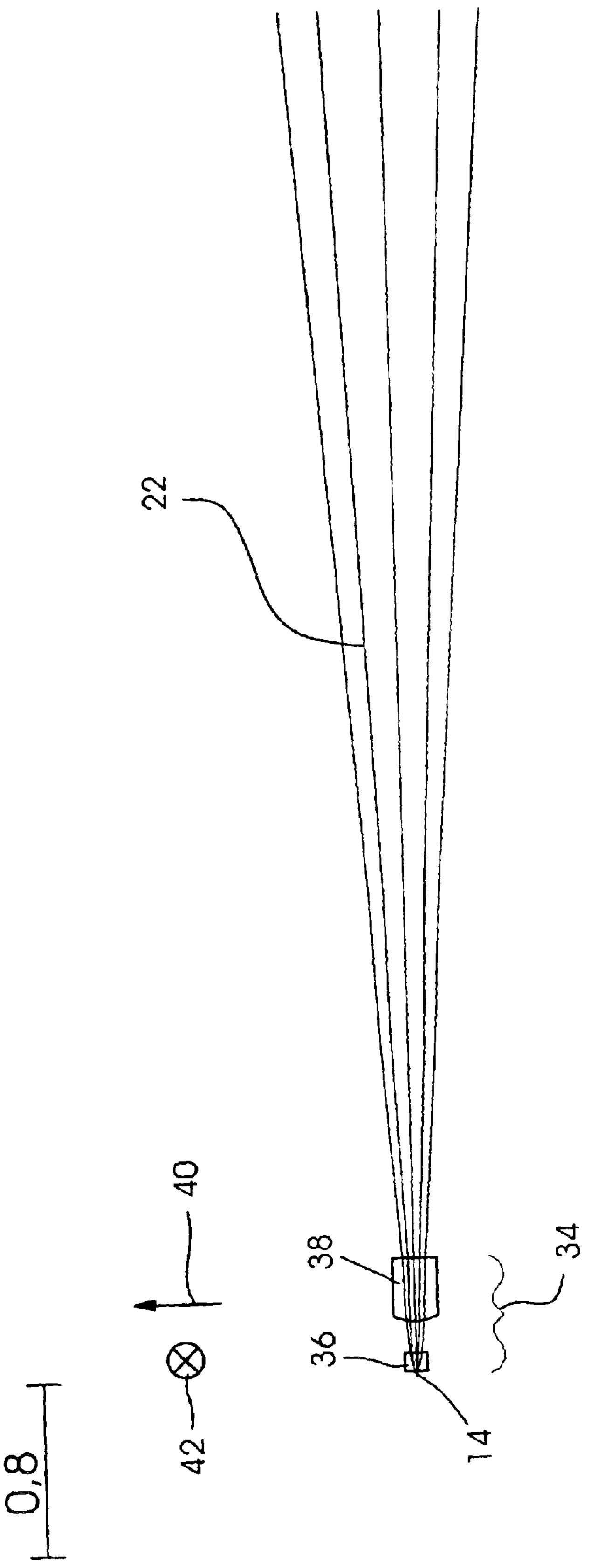

FIG. 2 shows a preferred embodiment of the micro-optics of the device according to the present invention for imaging a printing form. Subfigure A shows a view in the vertical plane in vertical direction 42 and with horizontal direction 40 out of the plane of paper, while Subfigure B shows a view in the horizontal plane in horizontal direction 40 and with vertical direction 42 into the plane of paper. At the top left of FIGS. 2A and 2B, a scale in millimeters is added for quantitative purposes. In a preferred embodiment, micro-optics 34 is composed of a fast-axis lens 36 and a slow-axis lens 38. Fast-axis lens 36 is a glass fiber which is polished on one side and reduces the divergence of all beams of the number of light sources 14 in the fast axis thereof. Slow-axis lens 38 is an array of a number of cylindrical lenses whose number corresponds to the number of light sources, each individual lens reducing the divergence of the beams of the light source 14 that is associated with the lens. Micro-optics 34 is designed in such a manner that a virtual intermediate image 44 is produced.

Figure 3:
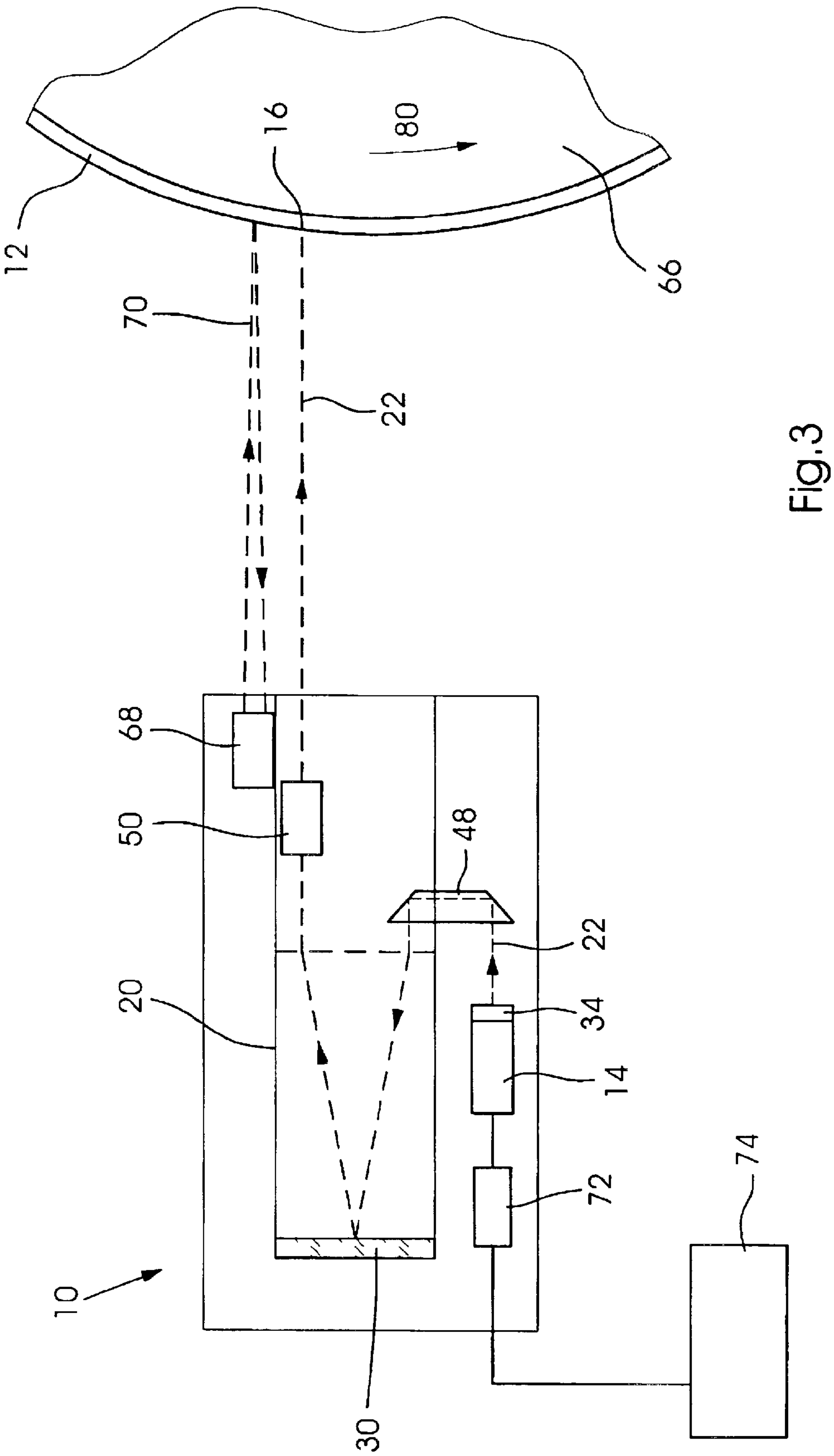
FIG. 3 is a schematic representation of an advantageous embodiment of the device according to the present invention for imaging a printing form on a printing form cylinder.

FIG. 3 relates to a schematic representation of an advantageous embodiment of the device according to the present invention for imaging a printing form on a printing form cylinder. FIG. 3 shows a device for imaging 10 a printing form 12 which is mounted on a printing form cylinder 66. The beams of a number of light sources 14, here individually addressable diode lasers on a bar, are shaped by micro-optics 34 and subsequently coupled a into macro-optics 20 having a mirror 30 via a Porro prism 48. Optical path 22 passes through macro-optics 20 twice and then passes through correction optics 50. Light sources 14 are projected onto image spots 16 on printing form 12. A triangulation sensor 68 is integrated for determining the position of printing form 12 compared to the focus position of the imaging optics of the imaging device 10. Sensor light 70 is reflected at the surface of printing form 12, so that it is possible to determine the distance. The surface of the printing form can have marked curvatures on the order of several 100 micrometers ("plate bubbles") so that the focus position is changed using movable lens 32. Triangulation sensor 68 can make a measurement at a point of printing form 12 which is reached in the image field of image spots 16 only at a later time by rotation of printing form cylinder 66 in direction of rotation 80. This point can also be offset from image spot 16 along the axis of printing form cylinder 66. The number of light sources 14 is connected to a laser driver 72 which is operatively connected to a control unit 74.

Figure 4:
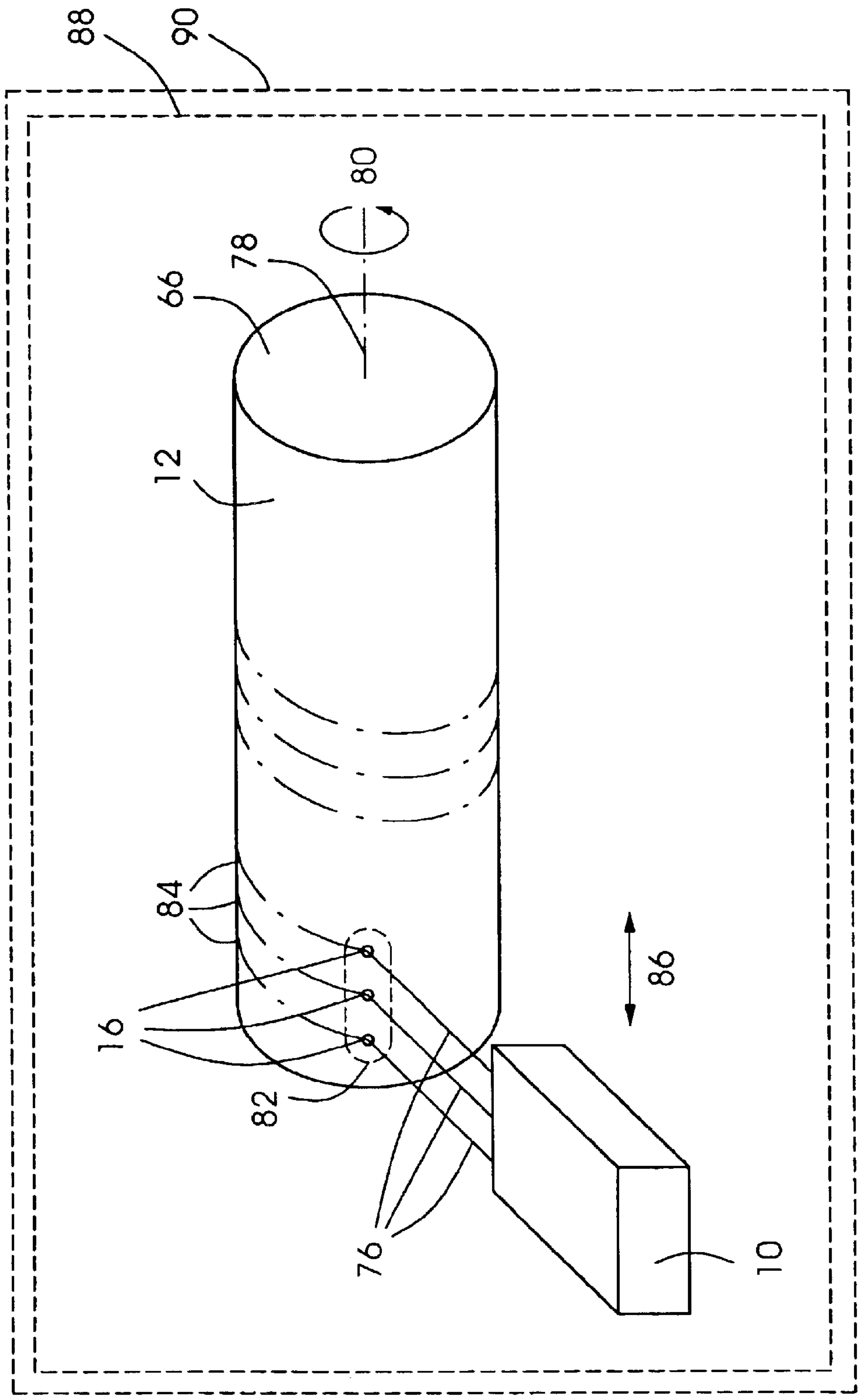
FIG. 4 is a schematic representation of an advantageous embodiment of the device according to the present invention for imaging a printing form in a printing unit of a printing press.

FIG. 4 shows a schematic representation of an advantageous embodiment of the device according to the present invention for imaging a printing form in a printing unit of a printing press. In a printing unit 88 of a printing press 90, an imaging device 10 according to the present invention is associated with a printing form 12 on a printing form cylinder 66. By way of example, three imaging beams 76 produce three image spots 16 in an image field 82 on printing form 72. Printing form cylinder 66 is rotatable about its axis 78 in direction of rotation 80; imaging device 10 is movable in direction of translation 86 parallel to axis 78. The unfolding line running through image spots 16 is preferably oriented substantially parallel to axis 78 of printing form cylinder 66. Printing dots are produced on printing form 12 by image spots 16 which are passed over the two-dimensional surface of printing form 12 along helical paths 84 (helices) through the interaction of the rotation of printing form cylinder 66 and the translation of imaging device 10.

The advance in direction of translation 86 and the rotation in direction of rotation 80 are preferably coordinated in such a manner that printing form 12 is traversed in a non-redundant manner, but in such a way that it is possible to place dense printing dots. In order to pass a number of imaging beams 76 (independently of whether they are arranged on one or on several imaging devices) in a non-redundant manner over the locations of a two-dimensional surface of a printing form 12 on which printing dots are to be placed by image spots 16, it is required to observe certain advance rules for the passage of positions (locations) that are imaged in a preceding step with respect to positions (locations) that are imaged in a subsequent step. These advance rules must be strictly complied with, especially if in an imaging step, n imaging beams 76 place n printing dots at positions (locations) which are not dense on printing form 12, i.e., whose distance is not the minimum printing dot spacing p (typically 10 micrometers). When looking at an azimuth angle of the printing form, then dense imaging can be achieved if printing dots are placed between already imaged printing dots in a subsequent imaging step. This procedure is also known by the term "interleaving method" (interleaving). An interleaving method for imaging a printing form is characterized, for example, U.S. Patent Publication No. US2002/0005890A1, the disclosure of which is incorporated herein by reference. For a given minimum printing dot spacing p, for a row of n imaging channels on an unfolding line which are equally spaced and whose neighboring image spots on the printing form have a distance a which is a multiple of minimum printing dot spacing p, a non-redundant advance by a distance (np) in the direction of the unfolding line is ensured when n and (a/p)

are relatively prime. The observance of an interleave advance rule results in interleaved helical paths 84 of the image spots. Along the unfolding line of an azimuth angle, image spots 16 are placed on helical paths 84 between image spots 16 of other helical paths 84, which were already placed at a previous point in time. In a printing unit 88 according to the present invention, a printing form 12 is imaged using imaging device 10 according to the present invention, preferably in an interleaving method, in particular in the interleaving method described in U.S. Patent Publication No. 2002/0005890 A1.

List of Reference Numerals

10 imaging device
12 printing form
14 number of light sources
16 image spot
18 imaging optics
20 macro-optics
22 optical path
24 optical axis
26 first principal plane
27 mirrored principal plane
28 second principal plane
30 mirror
32 movable lens
34 micro-optics
36 fast-axis lens
38 slow-axis lens
40 horizontal direction
42 vertical direction
44 virtual intermediate image
46 light-deflecting element
48 Porro prism
50 correction optics
52 first lens of the correction optics
54 second lens of the correction optics
56 first lens of the macro-optics
58 second lens of the macro-optics
60 third lens of the macro-optics
62 fourth lens of the macro-optics
64 fifth lens of the macro-optics
66 printing form cylinder
68 triangulation sensor
70 sensor light
72 laser driver
74 control unit
76 imaging beam
78 axis of the printing form cylinder
80 direction of rotation
82 image field
84 path of the image spots
86 direction of translation
88 printing unit
90 printing press

What is claimed is:

1. A device for imaging a printing form comprising:

a plurality of light sources;

imaging optics for producing a plurality of image spots of the light sources on the printing form, the imaging optics including at least one macro-optical system having refractive optical components, wherein an optical path from the light sources to the image spots passes through the macro-optical system twice;

wherein neighboring image spots of the plurality of image spots of the light sources on the printing form have an equal distance a, equal distance a being a whole-number multiple of a minimum printing dot spacing p.

2. The device for imaging as recited in claim 1 wherein the macro-optical system has an optical axis and the optical path is off-axis.

3. The device for imaging as recited in claim 1 wherein the macro-optical system has an optical axis and the optical path runs symmetrically to the optical axis.

4. The device for imaging as recited in claim 1 wherein the macro-optic system has a first principal plane and a second principal plane both located on one side of the macro-optical system.

5. The device for imaging as recited in claim 1 further comprising at least one mirror within the macro-optical system.

6. The device for imaging as recited in claim 5 wherein the macro-optical system includes at least one adaptive optic part or the at least one mirror is adaptive.

7. The device for imaging as recited in claim 1 wherein the macro-optical system includes at least one movable lens.

8. The device for imaging as recited in claim 1 wherein the light sources are individually addressable lasers.

9. The device for imaging as recited in claim 8 wherein the individually addressable lasers are diode lasers or solid lasers.

10. The device for imaging as recited in claim 8 wherein the individually addressable lasers are integrated on a bar.

11. A device for imaging a printing form comprising:

a plurality of light sources;

imaging optics for producing a plurality of image spots of the light sources on the printing form, the imaging optics including at least one macro-optical system having refractive optical components, wherein an optical path from the light sources to the image spots passes through the macro-optical system twice;

wherein the imaging optics includes a micro-optical system arranged downstream of the plurality of light sources and arranged upstream of the macro-optical system;

the micro-optical system producing a virtual intermediate image projected by the macro-optical system.

12. The device for imaging as recited in claim 11 wherein the light sources are individuallly addressable lasers and; the imaging optics includes a micro-optical system arranged downstream of the individually addressable lasers allowing beam diameters of the light beams emerging from the lasers to be influenced independently of each other in two orthogonal axes.

13. A device for imaging a printing form comprising:

a plurality of light sources;

imaging optics for producing a plurality of image spots of the light sources on the printing form, the imaging optics including at least one macro-optical system having refractive optical components.

wherein an optical path from the light sources to the image spots passes through the macro-optical system twice, further comprising at least one light-deflecting element, light of the plurality of light sources being coupled into the macro-optical system via the at least one light-deflecting element, wherein the light-deflecting element is a Porro prism.

14. A device for imaging a printing form comprising:

a plurality of light sources;

imaging optics for producing a plurality of image spots of the light sources on the printing form, the imaging optics including at least one macro-optical system having refractive optical components, wherein an optical path from the light sources to the image spots passes through the macro-optical system twice, wherein the macro-optical system is telecentric on both sides.

15. The device for imaging as recited in claim 1 wherein the macro-optical system provides 1:1 imaging.

16. The device for imaging as recited in claims 1 further comprising correction optics for adjusting an image size arranged downstream of the macro-optical system.

17. The device for imaging as recited in claim 16 wherein the correction optics includes a zoom lens system with two lenses.

18. The device for imaging as recited in claim 1 wherein the number of the plurality of light sources is n, n being determined by the value of the number (a/p).

19. A printing unit comprising at least one device for imaging as recited in claim 1.

20. A printing press comprising at least one printing unit as recited in claim 19.

21. A method for changing a relative position of an image spot with respect to a position of a printing form in a device for imaging a printing form, the device for imaging including a plurality of light sources and imaging optics for producing a plurality of image spots of the light sources on the printing form, the imaging optics including at least one macro-optical system wherein neighboring image spots of the plurality of image spots of the light sources on the printing form have an equal distance a, equal distance a being a whole-number multiple of a minimum printing dot spacing p, the method including:

moving a lens in the macro-optical system, the macro-optical system being traversed twice by an optical path from the light sources to the image spots.

22. The device for imaging as recited in claim 14 wherein the macro-optical system has an optical axis and the optical path is off-axis.

23. The device for imaging as recited in claim 14 wherein the macro-optical system has an optical axis and the optical path runs symmetrically to the optical axis.

24. The device for imaging as recited in claim 14 wherein the macro-optic system has a first principal plane and a second principal plane both located on one side of the macro-optical system.

25. The device for imaging as recited in claim 14 further comprising at least one mirror within the macro-optical system.

26. The device for imaging as recited in claim 25 wherein the macro-optical system includes at least one adaptive optic part or the at least one mirror is adaptive.

27. The device for imaging as recited in claim 14 wherein the macro-optical system includes at least one movable lens.

28. The device for imaging as recited in claim 14 wherein the light sources are individually addressable lasers.

29. The device for imaging as recited in claim 28 wherein the individually addressable lasers are diode lasers or solid lasers.

30. The device for imaging as recited in claim 29 wherein the individually addressable lasers are integrated on a bar.

31. The device for imaging as recited in claim 14 wherein the imaging optics includes a micro-optical system arranged downstream of the plurality of light sources and arranged upstream of the macro-optical system.

32. The device for imaging as recited in claim 22 wherein the imaging optics includes a micro-optical system arranged downstream of the individually addressable lasers allowing beam diameters of the light beams emerging from the lasers to be influenced independently of each other in two orthogonal axes.

33. The device for imaging as recited in claim 14 wherein the macro-optical system provides 1:1 imaging.

34. The device for imaging as recited in claims 14 further comprising correction optics for adjusting an image size arranged downstream of the macro-optical system.

35. The device for imaging as recited in claim 34 wherein the correction optics includes a zoom lens system with two lenses.

36. A printing unit comprising at least one device for imaging as recited in claim 14.

37. A printing press comprising at least one printing unit as recited in claim 36.

38. A method for changing a relative position of an image spot with respect to a position of a printing form in a device for imaging a printing form, the device for imaging including a plurality of light sources and imaging optics for producing a plurality of image spots of the light sources on the printing form, the imaging optics including at least one macro-optical system having refractive optical components, wherein an optical path from the light sources to the image spots passes through the macro-optical system twice, wherein the macro-optical system is telecentric on both sides, the method including:

moving a lens in the macro-optical system, the macro-optical system being traversed twice by an optical path from the light sources to the image spots.

* * * * *